United States Patent [19]

Loehrer

[11] Patent Number: 4,493,169
[45] Date of Patent: Jan. 15, 1985

[54] ROLLING COVER MEANS FOR COVERING A GUIDEWAY FOR A SLIDING CARRIAGE OF A MACHINE TOOL

[75] Inventor: Fritz Loehrer, Bäch, Switzerland

[73] Assignee: Maag Gear-Wheel & Machine Company Limited, Zürich, Switzerland

[21] Appl. No.: 446,190

[22] Filed: Dec. 2, 1982

[30] Foreign Application Priority Data

Dec. 17, 1981 [CH] Switzerland ............. 8061/81

[51] Int. Cl.³ ............................................. B24B 55/00
[52] U.S. Cl. ........................................ 51/268; 160/122
[58] Field of Search ................... 51/268, 271, 231; 160/122

[56] References Cited

U.S. PATENT DOCUMENTS

| | | | |
|---|---|---|---|
| 1,679,912 | 8/1928 | Mondloch | 51/268 |
| 1,937,985 | 12/1933 | Schnuck | 51/268 |
| 2,423,636 | 7/1947 | Boyd | 160/122 |
| 2,601,361 | 6/1952 | Blatz | 160/122 |
| 3,090,284 | 5/1963 | Dumming | 51/268 |

FOREIGN PATENT DOCUMENTS

| | | | |
|---|---|---|---|
| 711893 | 10/1941 | Fed. Rep. of Germany | 51/268 |
| 2946325 | 5/1981 | Fed. Rep. of Germany | 51/268 |
| 14940 | of 1905 | United Kingdom | 160/122 |

Primary Examiner—Roscoe V. Parker
Attorney, Agent, or Firm—Werner W. Kleeman

[57] ABSTRACT

Two rolling bands, meaning windable and unwindable bands, are affixed to a carriage or slide which is reciprocatingly movable along a guideway. The rolling bands are each arranged to be rolled-off from a respective drum journaled at each end of the guideway. A respective wheel is rigidly coupled to each one of the drums. Two belts interconnected by a tension spring are each arranged to be wound-up upon a respective one of the wheels in opposite direction to the winding direction of the rolling band on the related drum. Without itself being subjected to substantial loading and elongation differences, the tension spring continuously holds both of the rolling bands under tension.

7 Claims, 3 Drawing Figures

ROLLING COVER MEANS FOR COVERING A GUIDEWAY FOR A SLIDING CARRIAGE OF A MACHINE TOOL

BACKGROUND OF THE INVENTION

The present invention relates to a new and improved rolling cover means for covering a guideway for a sliding carriage or slide of a machine tool.

In its more particular aspects, the rolling cover means of the present development is of the type comprising two rolling bands, meaning windable and unwindable bands, each of which is affixed to the sliding carriage with one of its ends and extends away from the sliding carriage along the guideway in one respective direction. The guideway has two opposed ends, and there are provided two drums, each of which is disposed at the region of a respective one of the ends of the guideway, each of the drums being rotatably journaled for rotation about an axis extending transversely relative to a longitudinal direction of the guideway and being structured to wind-up and wind-off a respective one of the rolling bands. There are also provided two wheels, each of which is connected to a respective one of the drums to provide torque transfer or transmission. Moreover a tension member extends around both of the wheels and can be rolled-off upon the wheels free of slip.

Prior art rolling cover means as described, for example, in German patent publication No. 2,946,825, published May 21, 1981, in particular as depicted in FIGS. 1 and 4 thereof, each having both of the drums journaled for rotation upon a respective shaft which, in turn, is journaled for rotation at the guideway. Each shaft is connected to the associated drum by means of a torque-transferring helical or coil spring extending around the shaft within the drum. Each of the shafts has an end projecting from the associated drum where there is mounted a gear. A toothed belt extends around the gears of both of the shafts and both ends of the toothed belt are secured to the sliding carriage. When the sliding carriage or slide moves along the guideway both the gears and the coil springs of both the drums are driven by means of the toothed belt in such a way that the rolling band is wound-up upon the drum at that side towards which the sliding carriage moves, while the other rolling band is unwound from the associated drum. The coil springs arranged within the drums balance the respective increase and decrease in the roll diameter occurring during winding and unwinding of the rolling bands. Also, the coil springs hold the rolling bands under tension.

In this known arrangement as discussed hereinbefore, the spring excursions are smaller than with other prior art rolling cover means, wherein the springs connect the associated drum to a stationary component, and thus, there must be performed spring excursions which are proportional to the entire path of travel of the associated rolling band. However, even in the prior art structure described in greater detail hereinbefore, the spring excursions at any rate, are not so small as to be negligible in the event that the associated rolling band has such a long wind-up length that the rolling band is multipley wound-up around the associated drum. The larger the spring excursions required for winding and unwinding the rolling band, that much smaller is the specific load which is permitted at the spring during continuous operation. In the case of rolling cover means provided at guideways for rapidly reciprocating sliding carriages, however, the rolling bands must be tensioned by using considerable forces in view of their mass inertia, in order to provide for a sufficiently rapid wind-up operation. The required tensioning loads will further increase in case that the rolling bands are enclosed at both sides over their width by wiping seals and in case that the lateral edges thereof are guided between sealing ledges, as is particularly required for hydrostatic carriage guideways. Consequently, it cannot be avoided, then, with the prior art rolling cover means as described hereinbefore, that, in case of specifically high loads, the torque-transferring springs arranged within the drums will have to perform more or less long spring excursions. When such a spring breaks during a rapid movement of the sliding carriage, then it is hardly unavoidable that the rolling band which is pushed by the sliding carriage buckles, thus becoming unusable, possibly even destroying the associated sealing ledges. Furthermore, in the disclosed prior art arrangement additional space is required for the connection between the sliding carriage and the toothed belt in accordance with FIG. 4 of the aforementioned German Patent Publication No. 2,946,825.

SUMMARY OF THE INVENTION

Therefore, with the foregoing in mind it is a primary object of the present invention to provide an improved rolling cover means for covering guideway for a sliding carriage or slide in a machine tool which is designed such that the risk of damage is excluded under operating conditions.

Another important object of the present invention aims at the provision of new and improved rolling cover means of the aforementioned type wherein the space requirements thereof are kept as small as possible.

Another significant object of the present invention is directed to a new and improved construction of rolling cover means for covering a guideway for a sliding carriage in a machine tool, which is relatively simple in construction and design, quite economical to manufacture, extremely easy to use, not readily subject to breakdown or malfunction, and provides the high degree of precision required for such type of rolling cover means.

Now in order to implement these and still further objects of the invention, which will become more readily apparent as the description proceeds, the rolling cover means of the present development is manifested by the features that, each of the two wheels is rigidly coupled to its related drum, and each of the wheels is designed to wind-up the tension member. The tension member terminates at both of the wheels and extends around the same in a direction opposite to that of the respective rolling band at the related drum. The tension member is elastically elongatable.

In the rolling cover means according to the invention, the tension member, which may be elongated entirely or over a part of its length between the two wheels, adequately serves to maintain the tension required in the two rolling bands. Changes in the roll or package diameter of the drums, on the one hand, which occur due to the reciprocating movement of the sliding carriage, and in the diameter of the wheels upon which the tension member is wound-up, on the other hand, balance each other at least to a large extent so that the required spring excursions are small. Torque-transferring springs which are prone to break at least during longer spring excursions, as is well known, are replaced by the elongation of the entire or part of the tension member.

In a preferred embodiment of the invention the tension member comprises two belts or cables interconnected by a tension spring at the region between the wheels. The terms "belt" or "cable", as used herein, are to be understood in their broadest general sense; however, in the first instance there come under consideration belts made of sheet steel or metal plating or cables made of steel wire. The belts can be wound-up upon the wheels in correspondence with the way the rolling bands are wound-up upon the drums. If, however, there are used cables, then it is desirable to provide space on the wheels for axially juxtapositioning the required number of winding turns or coils of the cable.

Advantageously, at least one of the two wheels is coupled to the associated drum by a ratchet brake or means or equivalent clamping locking facility. Consequently, sensitive tensioning or retensioning of the rolling bands is facilitated.

The rolling bands may be guided between sealing ledges along the guideway, an arrangement which may be particularly required in vertically extending hydrostatic sliding carriage guideways. In that case it is of advantage if the rolling bands and the sealing ledges are each covered by an additional rolling band in accordance with a further feature of the invention. Dust and dirt, occurring above all in conjunction with grinding machines, is thereby prevented from reaching the rolling bands, adhering thereto and passing between the sealing ledges during operation, and thereby, prematurely destroying the same as well as the edges of the rolling bands.

According to a further preferred development of the last-mentioned aspect of the invention, the additional rolling bands may be made of a material having rubber elasticity or an elastomeric material.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
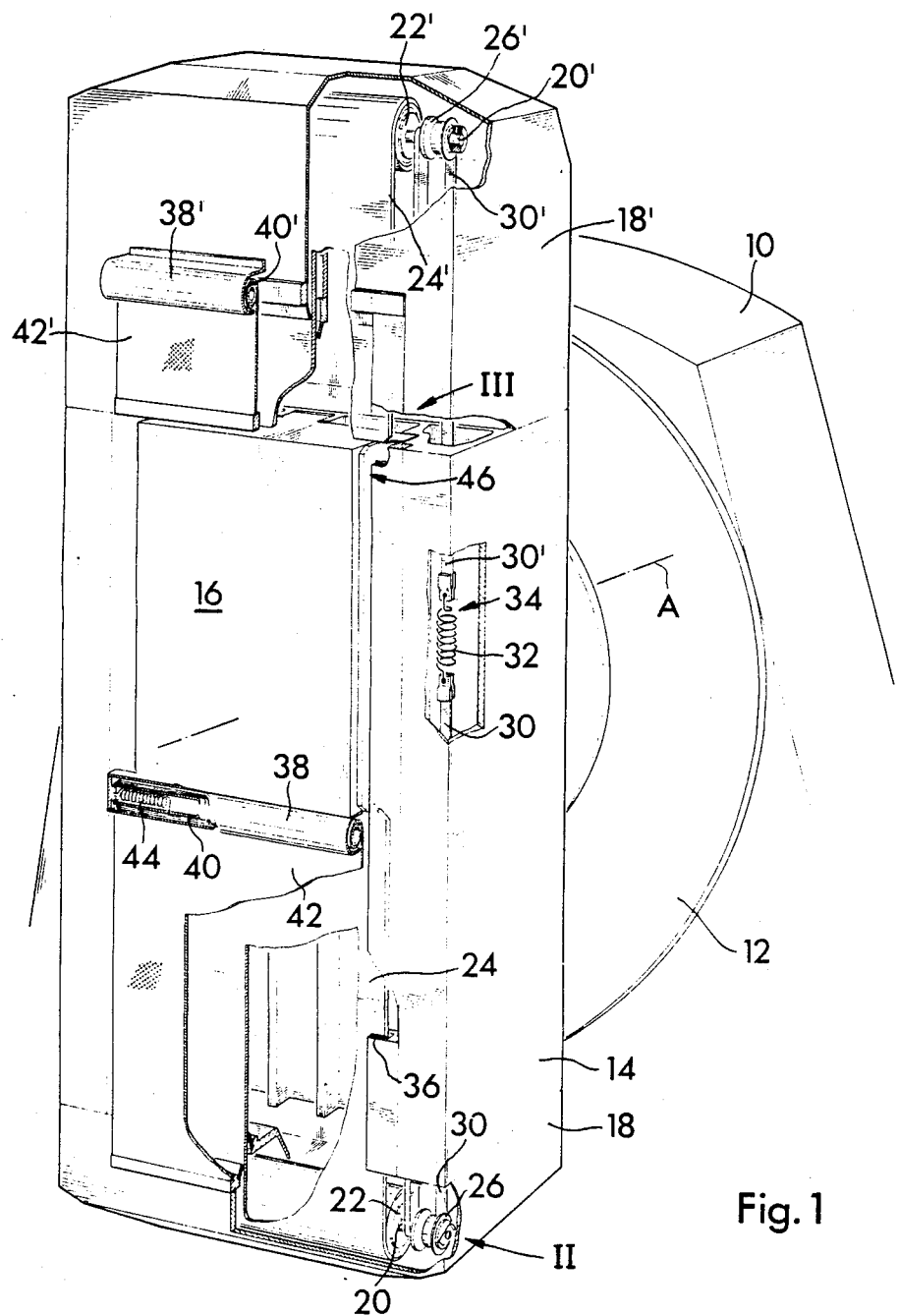
FIG. 1 is a perspective view, partially in section and partially cutaway, of the rolling cover means according to the invention.
Figure 2:
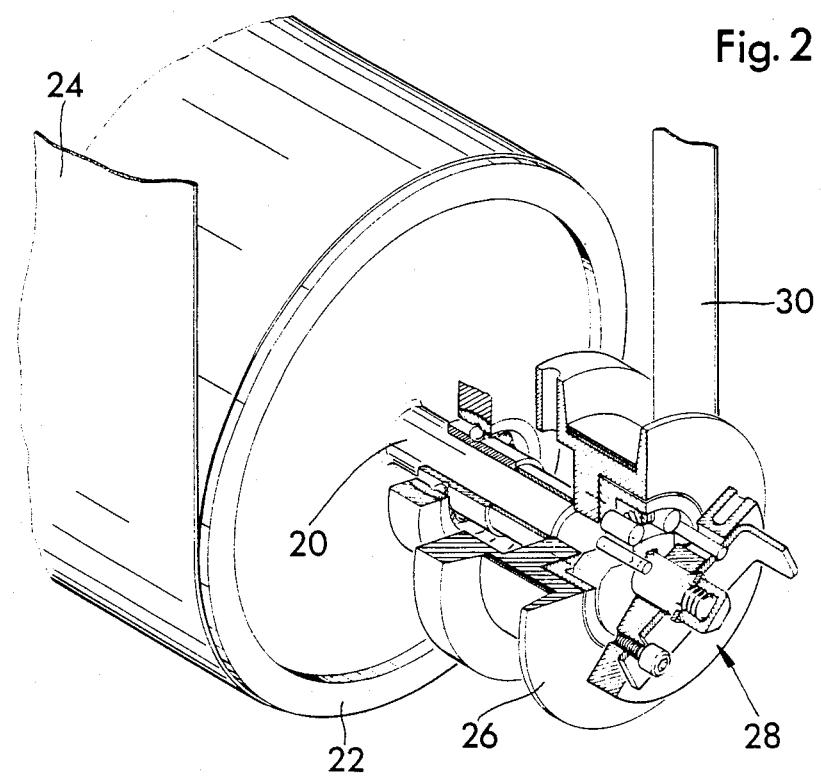
FIG. 2 shows the region marked II in FIG. 1 on an enlarged scale.

Describing now the drawings, it is to be understood that in order to simplify the illustration only enough of the construction of the rolling cover means and related machine tool has been shown as needed for those skilled in the art to readily understand the underlying principles and concepts of the present invention. Turning now specifically to FIG. 1, there has been illustrated an upper portion of a stand or post 10 of a conventional gear grinding machine. At the stand 10 there is secured a guideway 14 which is mounted so as to be pivotable about a substantially horizontal axis A by means of a circular pivoting bearing or journal 12 or equivalent structure. In the drawings the guideway 14 is shown in a substantially vertical arrangement. By pivoting about the axis A the guideway 14, however, may be adjusted in accordance with the helix angle of the gears intended to be ground on the gear grinding machine. The guideway 14 guides a reciprocating sliding carriage or slide 16 which is provided for mounting thereat standard grinding assemblies (not shown).

A housing 18, in which a transversely extending shaft 20 is journaled is mounted to the lower end of the guideway 14. A drum 22 is secured to the shaft 20 and part of a rolling band 24 or the like is wound-up upon the drum 22. A wheel 26 is connected to one end of the shaft 20 by conventional ratchet means or ratchet brake 28. A belt or cable 30 is wound-up upon the wheel 26 in a direction which is opposite to the winding direction of the rolling band 24. Consequently, the winding directions of the rolling band 24 upon the drum 22, on the one hand, and the belt 30 upon the wheel 26, on the other hand, are opposite to each other, so that the belt 30 will unwind when the rolling band 24 is wound-up and vice versa.

The components just described and associated with the lower end of the guideway 14, beginning with the housing 18 and ending with the belt 30, are repeated in identical or at least similar form at the region of the upper end of the guideway 14; these are the housing 18', the shaft 20', the drum 22', the rolling band 24', the wheel 26' and the belt or cable 30'.

Each of the two rolling bands 24 and 24' is secured to the sliding carriage 16 by means of its respective end remote from the associated drum 22 and 22', respectively. The belts 30 and 30' are interconnected at their respective ends remote from the respectively related wheels 26 and 26', by means of a coiled or helical tension spring 32 or equivalent structure. The assembly formed by the belts 30 and 30' and the tension spring 32 forms a tension member 34 designed to be continually elastically elongated at the region intermediate the two wheels 26 and 26'. This is due to the tension spring 32 exclusively moving back-and-forth at this region when the sliding carriage 16 is reciprocated along the guideway 14.

Both of the lateral edges of the rolling bands 24 and 24' which extend substantially in parallelism to the longitudinal direction of the guideway 14 are sealingly guided between two respective sealing ledges or sealing strips 36. The interior of the guideway 14 is thus sealed towards the outside in order to prevent loss of oil and so as to be protected against the penetration of dust and dirt from the exterior.

A rolling band housing 38 is secured to the lower end of the sliding carriage or slide 16 and an additional drum 40 is rotatably journaled therein. An additional rolling band 42 is wound-up partially thereon, the end of this additional rolling band 42 being fixed to the lower housing 18. A helical or spiral spring 44 or the like is fitted into the additional drum 40 and generates sufficient torque for winding-up the additional rolling band 42 in each position of the sliding carriage 16.

In a manner corresponding thereto a rolling band housing 38' is secured to the upper housing 18' and an additional drum 40' is rotatably journaled therein. An additional rolling band 42' is wound-up upon the additional drum 40' under the action of a helical or spiral spring not shown in this case, the lower end of the additional rolling band 42' being fixed to the sliding carriage 16. Both the additional rolling bands 42 and 42' cover the rolling bands 24 and 24' as well as the sealing ledges 36, and thus, offer an additional protection against the entry of dust and dirt as well as against mechanical damage to the rolling bands 24 and 24' and the sealing ledges 36. The helical or spiral springs operate under high specific loads; they are mounted in such a way as to be exchangeable in simple manner in the case of breakage.

Preferably, the additional rolling bands 42 and 42' are made of fiber-reinforced plastics, while the rolling bands 24 and 24' preferably are made of steel.

Figure 3:
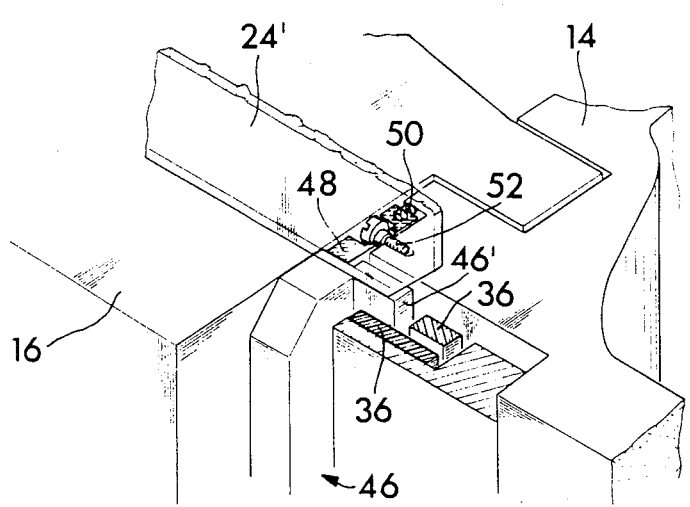
FIG. 3 shows the region marked III in FIG. 1 on an enlarged scale.

Laterally of the sliding carriage 16 there are mounted bent-off or flexed sealing ledges or sealing strips 46 which extend in parallelism to the guideway 14 from the end of the rolling band 24 to that of the rolling band 24'. In accordance with FIG. 3, the sealing ledges 46 each comprise a leg 46' sealingly guided between the outer sealing strip 36 and the guideway 14, thus sealing the interior of the guideway 14 on the side of the sliding carriage 16 towards the exterior against the loss of oil as well as against the intrusion of dust and dirt from the exterior. Slide rails 48 are provided as additional sealing means and also extend in parallel to the guideway 14. The slide rails 48 are slightly pressed against the related bent-off or flexed sealing strip 46 and against the rolling bands 24 and 24', respectively, by means of springs 50 or equivalent biasing means. Screws or threaded bolts 52 ensure that the slide rail 48 bears against the guideway 14.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A rolling cover means for covering a guideway for a sliding carriage of a machine tool, comprising:
    two rolling bands each affixed to said sliding carriage with one of its ends;
    said rolling bands each extending away from said sliding carriage along said guideway in one respective direction;
    said guideway having two ends;
    two drums each of which is disposed at the region of a respective one of said ends of said guideway;
    each of said drums being rotatably mounted for rotation about an axis extending transversely relative to a longitudinal direction of said guideway and serving to wind-up and unwind a respective related one of said rolling bands;
    two wheels each of which is rigidly coupled in torque-transmitting relationship to a respective one of said drums;
    a tension member extending around both said wheels and capable of being rolled-off substantially free of slip from said wheels;
    each of said wheels serving to wind-up said tension member;
    said tension member terminating at both said wheels and extending around the same in a direction opposite to that of the rolling band at the drum associated with the related wheel; and
    said tension member being structured to be elastically elongatable.

2. The rolling cover means as defined in claim 1, wherein:
    said tension member comprises two belts interconnected by a tension spring at a region intermediate said wheels.

3. The rolling cover means as defined in claim 1, wherein:
    said tension member comprises two cables interconnected by a tension spring at a region intermediate said wheels.

4. The rolling cover means as defined in claim 1, further including:
    ratchet means for coupling at least one of said wheels to a related one of said drums.

5. The rolling cover means as defined in claim 1, further including:
    sealing ledges for guiding therebetween said rolling bands along said guideway; and
    a respective additional rolling band for covering said rolling bands and said sealing ledges.

6. The rolling cover means as defined in claim 5, wherein:
    said additional rolling bands are made of a material having rubber elasticity.

7. The rolling cover means as defined in claim 1, wherein:
    said elastically elongatable tension member is located essentially coextensive with said two rolling bands and said sliding carriage.

* * * * *

UNITED STATES PATENT AND TRADEMARK OFFICE
CERTIFICATE OF CORRECTION

PATENT NO. : 4,493,169

DATED : January 15, 1985

INVENTOR(S) : FRITZ LOEHRER

It is certified that error appears in the above-identified patent and that said Letters Patent is hereby corrected as shown below:

Column 1, line 63, please delete "multipley" and insert --multiply--

Signed and Sealed this

Seventeenth Day of September 1985

[SEAL]

Attest:

Attesting Officer

DONALD J. QUIGG

Commissioner of Patents and Trademarks—Designate